May 24, 1938.                G. R. LEWERS                2,118,208
INCINERATION
Filed Dec. 10, 1936
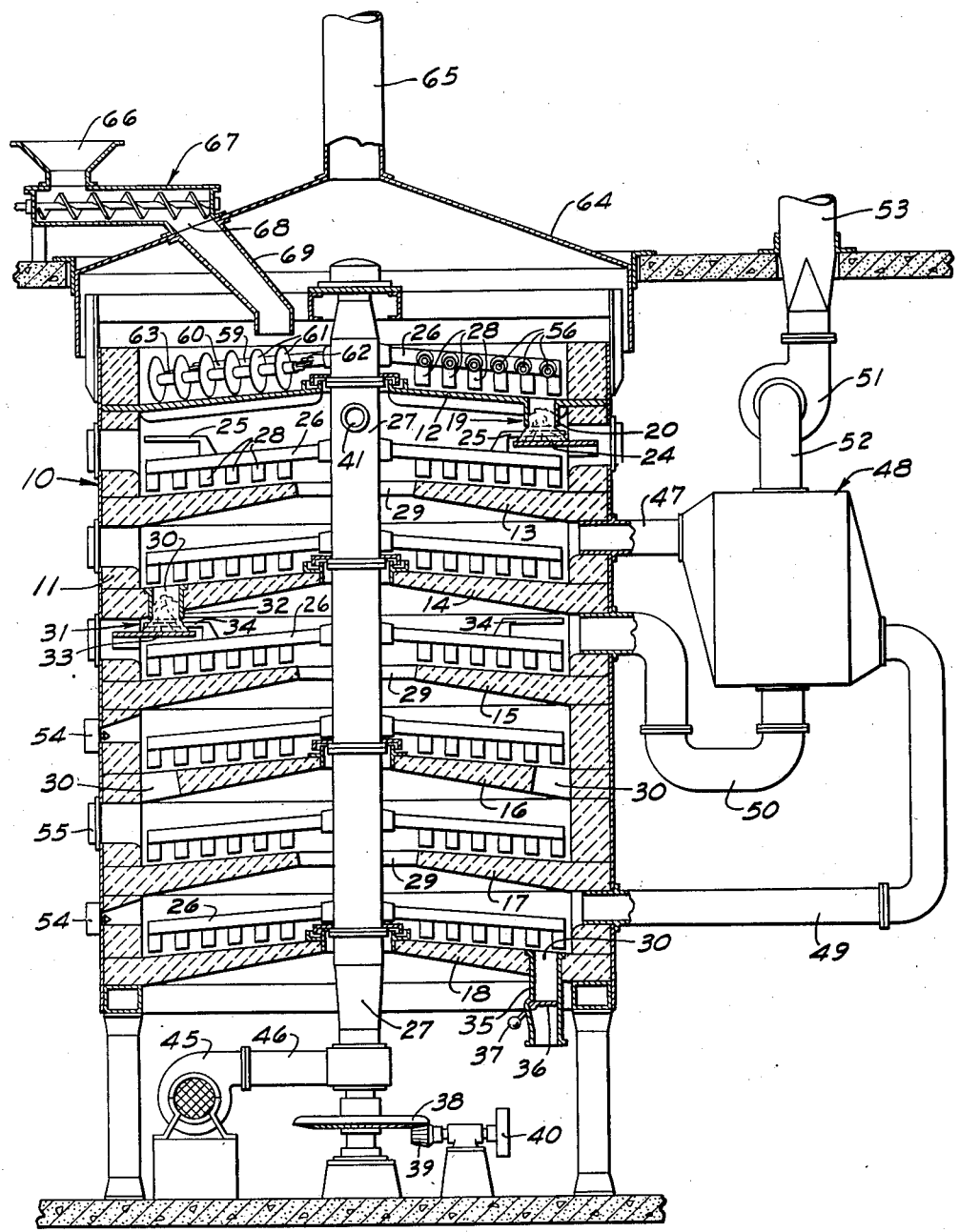
INVENTOR
GEORGE R. LEWERS
BY Louis L. Amant
his ATTORNEY Patented May 24, 1938

2,118,208

UNITED STATES PATENT OFFICE 2,118,208

INCINERATION

George R. Lewers, Brooklyn, N. Y., assignor, by mesne assignments, to Underpinning & Foundation Company, Inc., New York, N. Y., a corporation of New York Application December 10, 1936, Serial No. 115,109

6 Claims. (Cl. 110—12)

The present invention relates to improvements in the treatment of material and especially to treatment in which moisture and volatile matter are removed from the solids, as by a drying operation, and the solids are then burned. This invention, although adapted for the treatment of other materials, is especially adapted for the treatment and disposal of waste materials such as garbage and sewage materials including sludge and screenings.

The principal objects of the invention are to provide novel, advantageous and efficient forms of apparatus and methods for effecting treatment of the general character specified.

Heretofore, it has been proposed in connection with the disposal of sewage sludge to dewater it to some extent by means of a vacuum filter and then to feed it into the upper part of a multiple-hearth furnace through which it is passed downwardly from hearth to hearth, by rabbling the material on each hearth towards one or more outlets, while being dried in the upper part of the furnace and finally burned in the lower part of the furnace. The drying of the high-moisture content material results in the generation of large volumes of steam usually superheated and the production of malodorous gases. These disadvantages may be avoided to a great extent by a preliminary drying of the material before introducing it into the upper part of the furnace. It is also desirable to provide for this preliminary drying in such a manner as not to interfere with or delay the drying and burning action in the furnace.

It is therefore another object of the invention to provide for a low temperature drying of the sludge or filter cake passing to the multiple hearth furnace. According to the present invention, this may be done by placing over the upper part of the furnace, a hood of somewhat greater diameter than the furnace so that air may pass into the hood at the periphery thereof and together with vapors and gases received from material, dried on the top of the furnace before being admitted to the furnace, flow upwardly through the hood and through an upright flue or stack before being discharged from the apparatus. Material to be treated, such as sewage sludge, is fed through a gas seal, into the hood and falls on the heat-conducting furnace top and is rabbled toward an outlet through which the material is passed through another gas seal into the interior of the furnace.

The rabbling action in itself agitates and turns up material on the furnace top and exposes it to air passing thereover. Due, however, to the moisture content of the material there is a tendency for the material to cake. It may therefore be desirable to provide additional means for breaking up the material, for example a device comprising a plurality of discs carried around with the rabbling means and having the same general action as a disc plow.

The drying action on the material resting on the furnace top may also be improved by blowing thereover preheated air supplied, for example, through the central shaft of the rabbling means, ducts in one or more rabble arms above said top and nozzles arranged along the rabble arms. The air together with vapors taken up from the material on the furnace top will rise in the hood and pass off through a flue at the top thereof.

Other objects, features and advantages will appear upon consideration of the following description and of the drawing in which the figure is a view in vertical section of apparatus embodying a preferred form of the invention.

Referring to the drawing, the apparatus is illustrated as including a multiple-hearth furnace 10, having a peripheral wall 11, a top 12 and hearths 13, 14, 15, 16, 17 and 18. Material may be introduced into the uppermost compartment over the hearth 13 through a gas seal 19, comprising a tube 20 projecting downwardly from a corresponding opening in the top 12 and terminating a short distance above a shelf 24. Material accumulating on the shelf 24 closes the tube 23 and prevents the passage of air and gases. Material on the shelf or platform 24 may be discharged therefrom to the hearth 13 by means of one or more sweeps or sweep arms 25 mounted and operated so as to pass between the lower end of the tube 23 and the shelf 24 thus sweeping material from the shelf or platform 24 to fall on the hearth 13 and enabling material in the tube 23 to settle toward the platform 24.

Preferably each sweep or sweep arm 25 is mounted on a rabble arm 26 projecting from a hollow vertical shaft 27 and forming part of a rabbling device also comprising blades or members 28 depending from each arm 26 and so inclined as to rabble material on the hearth 13 toward a central outlet 29 during rotation of the shaft 27. As here shown the material is fed through the top 12 near its periphery and then rabbled towards the central outlet 29, but it should be understood that the material might be introduced near the shaft 27 and rabbled outwardly to peripheral outlets.

Hearths 15 and 17 are also provided with central outlets 29, hearth 14 is provided with a peripheral outlet 30, hearth 16 is provided with one or more peripheral outlets 30 and hearth 18 forming the bottom of the furnace is preferably formed with a single peripheral outlet 30. Material on the hearths 14, 16 and 18 may be rabbled outwardly to their peripheral outlets by rabbling devices similar to those cooperating with the material on hearth 13 but having their blades 28 properly inclined for this purpose. The rabbling devices above the hearths 15 and 17 are similar to those cooperating with the hearth 13 and act to rabble the material inwardly toward the central outlets.

The hearth 14 may be used to divide the furnace into an upper drying section and a lower burning section and to this end the outlet 30 of this hearth may be provided with a gas seal 31 comprising a tube 32 extending downwardly through the outlet 30 toward a platform or shelf 33 on which the material discharged from the hearth 14 accumulates and keeps the tube 32 closed. Material from the platform 33 may be fed down to the hearth 15 by means including suitable sweeps or sweep arms 34 mounted on the rabble arms 26 projecting from the shaft 27 over the hearth 15. The outlet 30 of the lowermost hearth or bottom 18 is provided with a chute 35 having a gas seal which may be in the form of a gate or door 36 normally urged to closed position by means of a weighted arm 37. The hollow shaft 27 may be rotated by means of a bevel gear 38 thereon, a bevel gear 39 meshing with the bevel gear 38 and a pulley 40 connected with the bevel gear 39, and actuated from any suitable source of power.

Air may be supplied to the uppermost compartment of the furnace through one or more nozzles or outlets 41 discharging air from the interior of the rotating hollow shaft 27. For this purpose, air may be supplied to the lower end of shaft 27 by a suitable fan 45 and a duct 46 leading therefrom and communicating with the interior of the shaft. The air flowing through the shaft 27 is heated in passing through the lower part of the furnace and after engaging the material on the hearth 13 passes downwardly through the central opening 29, over the material on the hearth 14, and then out of the furnace through a duct 47 to the lower temperature part of heat exchanger 48 where the temperature of the air and vapors with which it is laden is raised preliminary to passing them through a duct 49 into the lower part of the burning section of the furnace.

The air introduced in the lower part of the burning section, preferably the lowermost compartment, aids in burning the material fed downwardly from the drying section through the gas seal 31 and the hot combustion gases with excess air, if there be any, are discharged from the uppermost compartment of the burning section and passed through a duct 50 to the higher temperature part or side of the heat exchanger 48. The flow of air and gas through the drying section and then through the burning section may be induced by fan 51 which draws the hot gases supplied by the duct 50 from the heat exchanger 48 through the duct 52 and discharges the gases to a flue or stack 53. The apparatus described up to this point is substantially the same as some forms of apparatus proposed heretofore.

One difficulty in the use of the apparatus just described is that, when material with a high moisture content is fed through the drying and burning sections of the furnace, a large volume of vapor will be produced from the moisture in the material and the resulting mixture of air and vapors will be very wet. When this mixture of air and vapor is fed to the lower part of the furnace, the vapor will have to be raised to a high temperature in order that combustion may take place in the burning section and, inasmuch as a great deal of heat is required to raise such a volume of vapor to the required temperature, it is difficult to produce combustion without assistance from use of auxiliary fuel, for example in oil burners 54 supplied at any desired points. In this connection it may be said that burners 54 may be provided in connection with the zones or compartments of the drying section to aid in starting the furnace and where desired each compartment may be provided with a door 55 to give access to material on the hearth at the bottom of the compartment.

According to the present invention it is proposed to dry the material on the top 12 of the furnace, which top is preferably of metal which will not be injured by depositing the sewage sludge thereon and will tend to assist the heating of the material thereon due to the heat conductivity of the metal. In order to dry the sewage sludge deposited on the top 12 and also to feed it to the gas seal 19 through which it passes to the hearth 13, the shaft 27 is provided above the top 12 with one or more rabbling arms 26 provided with suitably inclined blades 28, and heated air may be blown on the material on the top 12 through nozzles 56 carried by an arm 26 and supplied with air from the hollow shaft 27 through a suitable passage in the arm 26.

The material falling on the top 12 has such a high moisture content that it tends to cake very easily, and in order to break up the material and keep it agitated, the shaft 27 may be provided with one or more arms 59 to each of which is connected, at a suitable angle, a shaft 60 carrying discs or disc rabbles 61 which act like the discs of a disc harrow. The shaft 60 may be connected with the arm 59 by means of a link 62 near the shaft 27 and a longer link 63 at the outer end of the arm 59.

In connection with the agitation of the material on the hearth 12 and the blowing of heated air thereon through nozzles 56, a portion of the moisture will be changed to vapor and pass off through the atmosphere. The vapors thus produced may have objectionable odors and it may be desirable therefore to conduct them to some point at a considerable distance from the furnace, preferably at a considerable height above the same. To this end there may be provided at the top of the furnace a cover or hood 64 receiving any vapors thus generated and connected with an upwardly extending flue 65 through which vapors evolved below the hood 64 will be discharged. The hood 64 may be provided with a downwardly extending peripheral rim to prevent escape of the vapors at the sides and this rim may be spaced from the peripheral wall of the furnace to permit air to pass upwardly into the hood and be discharged with the air and vapors therein through the duct or flue 65 at the top of the hood. Material may be supplied through the hood 64 by suitable feeding means comprising a hopper 66 receiving sludge to be treated and a screw conveyor 67 receiving material from the hopper 66 and discharging it through an opening 68 in the hood 64 and through a chute 69 extending from the opening 68 in the hood 64 to a point relatively near the hollow shaft 27. The screw conveyor 67 serves as a gas seal to prevent the escape of air and vapors except through the flue 65.

During normal operation, material, such as sewage sludge in the form of cake from a vacuum filter, is deposited in the hopper and transferred by the closed screw conveyor 67 and inclined chute 69 through the hood 64 and deposited on the metal furnace top 12. There the material is heated to some extent by heat conducted through the metal top 12 from the interior of the furnace, and is broken up and agitated both by the rabbling blades 28 and the rotary discs 61. During this breaking up and agitation, air heated in its passage through the furnace in the hollow shaft 27 flows through an arm 26 and is discharged through nozzles 56 over the agitated material. As a result of this action, moisture is evaporated and the air laden with this vapor passes out of the hood 64 and through the flue or stack 65.

The material on the furnace top 12 is gradually passed downwardly through the gas seal 19 to the hearth 13 and downwardly from hearth to hearth through the drying section and the gas seal 31 to the burning section and finally out of the furnace through chute 35 at the bottom of the furnace. Air, preheated to some extent in passing through shaft 27 is discharged from the hollow shaft 27 and through one or more outlets 41 into the upper part of the drying zone, is drawn downwardly into the lowermost compartment or zone of the drying section, and is discharged therefrom through the lower temperature part of the heat exchanger 48 to the lower part of the burning section, preferably the lowermost compartment of the furnace. The draft is upward in the burning section and the hot combustion gases flow from the upper part of the burning section through the higher temperature part of the heat exchanger 48 to the fan 51 and thence to the discharge flue or stack 53.

Due to the preliminary drying on the furnace top 12, the moisture content of the material passing into the drying section is very much lower than usual. Consequently the volume of moisture vapor taken up by the preheated air in passing through the drying section is reduced and the gaseous mixture may be raised to a higher temperature in passing through the heat exchanger 48. Also due to the higher temperature of the mixture entering the lower part of the burning section, combustion conditions in the burning section are improved and the hot gases discharged from the upper part of the burning section are at a higher temperature, thus enabling the mixture of air and vapors passing through the heat exchanger to be raised to a higher temperature.

The temperature in the space betwen the furnace top 12 and the hood 64 is not sufficiently high to evolve vapors or gases having noxious odors, and any noxious odor produced in the drying section below said top 12 will be eliminated in passing through the lower temperature part of the heat exchanger 48 and the burning section of the furnace.

It should be understood that various changes may be made and that certain features may be used without others without departing from the true scope and spirit of the invention.

Having thus described my invention, I claim:

1. In combination with a multiple-hearth furnace having a top with a gas seal through which material is introduced to the furnace, means for breaking up material on said top and rabbling it to said gas seal, means for blowing heated air over the material on said top to take up moisture and other vapors therefrom, and means for diluting with additional air the mixture of air and vapors thus formed and conducting it away from the furnace.

2. In combination with a multiple-hearth furnace having a top with a gas seal through which material is introduced into the furnace, means for breaking up and agitating material on said top and rabbling it to said gas seal for passage therethrough into the furnace, means for blowing heated air over the surface of the material on said top to take up vapors therefrom, and means for conveying away from the furnace the mixture of air and vapor thus formed comprising a hood over the top of the furnace and slightly spaced therefrom at the periphery to permit the admission of outside air to the hood, and a flue communicating with the interior of said hood at the upper part thereof.

3. In combination with a multiple-hearth furnace having a top with a gas seal through which material is introduced into the furnace, means for breaking up and agitating material on said top and rabbling it to said gas seal for passage therethrough into the furnace, means for blowing heated air over the surface of the material on said top to take up vapors therefrom, and means for conveying away from the furnace the mixture of air and vapors thus formed comprising a hood over the top of the furnace and slightly spaced therefrom at the periphery to permit the admission of outside air to the hood, a flue communicating with the interior of said hood at the upper part thereof, and means including a gas seal in said hood for supplying material to said top.

4. In combination with a multiple-hearth furnace having a heat-conducting metal top with a gas seal through which material is introduced into the furnace, means for agitating material on said top and rabbling it to said gas seal, means for blowing preheated air over said material to take up vapors of moisture therefrom, and means for collecting the mixture of air and vapors thus formed, diluting it with air and discharging it into the outside air at a point relatively distant from the furnace.

5. The method of disposing of material such as sewage sludge, which comprises passing the material downwardly through a plurality of zones, retaining it temporarily in each zone before passing it to the next lower zone, passing heated air over the material in the uppermost zone to effect a preliminary drying action by removing moisture vapors therefrom, withdrawing the mixture of preheated air and vapors and discharging them into the outside air, passing heated air through a plurality of intermediate drying zones to effect drying at a higher temperature and the taking up by the air of vapors of moisture and volatile material, reheating the stream of air and vapors from the intermediate drying zones and passing them through a plurality of burning zones thereby eliminating noxious odors and producing gases of combustion, and withdrawing the hot gases of combustion from the burning zones and passing them into heat exchange relationship to the air and gases passing from the intermediate drying zones to the burning zones to reheat the air and vapors.

6. The method of disposing of material such as sewage sludge, which comprises passing the material downwardly through a plurality of zones, retaining it temporarily in each zone before passing it to the next lower zone, passing heated air over the material in the uppermost zone to effect a preliminary drying action by removing moisture vapors therefrom, withdrawing the mixture of preheated air and vapors and discharging them into the outside air, passing heated air downwardly through a plurality of intermediate drying zones to effect drying at a higher temperature and the taking up by the air of vapors of moisture and volatile material, reheating the stream of air and vapors from the intermediate drying zones and passing them upwardly through a plurality of burning zones thereby eliminating noxious odors and producing gases of combustion, and withdrawing the hot gases of combustion from the burning zones and passing them into heat exchange relationship to the air and gases passing from the intermediate drying zones to the burning zones to reheat the air and vapors.

GEORGE R. LEWERS.